UNITED STATES PATENT OFFICE.

OSCAR GÜNTHER AND LEOPOLD HESSE, OF ELBERFELD, GERMANY, ASSIGNORS TO FARBENFABRIKEN VORM. FRIEDR. BAYER & CO., OF ELBERFELD, GERMANY, A CORPORATION OF GERMANY.

AZO DYE.

No. 877,644.     Specification of Letters Patent.     Patented Jan. 28, 1908.

Application filed November 19, 1907. Serial No. 402,814.

*To all whom it may concern:*

Be it known that we, OSCAR GÜNTHER and LEOPOLD HESSE, doctors of philosophy, chemists, citizens of the German Empire, residing at Elberfeld, Germany, Kingdom of Prussia, have invented new and useful Improvements in Azo Dyestuffs, of which the following is a specification.

Our invention relates to the manufacture and production of new disazodyestuffs dyeing cotton from bluish-red to violet to blue shades remarkable for their fastness to light. They are obtained by first producing intermediate compounds from the diazocompounds of 1.8-aminonaphthol sulfonic acids with suitable amins, then diazotizing these intermediate products and combining the thus produced diazoazocompounds with 2-amino-5-naphthol-7-mono sulfonic acid. The same dyestuffs are obtained if in the above mentioned process the diazocompounds of 1.8-aminonaphthol sulfonic acids are replaced by the diazocompounds of acidylized derivatives of these acids e. g. by the sulfurous acid esters, the acetyl derivatives or the arylsulfonic acid esters of 1.8-aminonaphthol sulfonic acids. The acidyl groups such as the sulfurous acid residue, the acetyl or arylsulfonic groups which are attached to the hydroxyl group can be eliminated either from the intermediate compounds or from the final dyestuffs. The presence of the acidyl groups in the hydroxyl groups of the aminonaphthol sulfonic acids render the hydroxyl group inactive, and prevents the formation of by-products during the production of the dyestuffs.

The new acetylized derivatives of the diazonaphthol sulfonic acids can be obtained by treating the diazocompounds of 1.8-aminonaphthol sulfonic acids with acetic acid anhydrid. The new arylsulfonic acid esters are obtained by treating in an alkaline solution 1.8-aminonaphthol sulfonic acid with arylsulfonic acid chlorids; e. g. benzene sulfonic chlorid, toluene sulfonic chlorid, naphthalene sulfonic chlorid, etc.

The new dyestuffs are in the shape of their alkaline salts dark powders easily soluble in water. Upon reduction with stannous chlorid and hydrochloric acid the dyestuffs are decomposed 1.8-aminonaphthol sulfonic acid, a diamin and 2.6-diamino-5-naphthol-7-sulfonic acid are formed.

In order to carry out this process we can e. g. proceed as follows, the parts being by weight: 341 parts of the monosodium salt of 1.8-aminonaphthol-3.6-disulfonic acid are dissolved with the necessary quantity of sodium carbonate in water to produce a neutral solution. It is then diazotized in the usual way with 69 parts of sodium nitrite and hydrochloric acid. The resulting diazocompound is introduced into a solution of 157.5 parts of the hydrochlorid of para-xylidin in water and sodium acetate is added to neutralize the free mineral acid. The mixture is acidulated and the intermediate compound is salted out, filtered off and converted into its neutral sodium salt. This is then diazotized at about 5° C. with 69 parts of sodium nitrite and hydrochloric acid and to remove any diazoxylidin if it should be present the diazocompound is salted out and filtered off. It is then stirred up with water to a paste and is added to a solution of 239 parts of 2-amino-5-naphthol-7-sulfonic acid containing an excess of sodium carbonate. The combination is complete after a short time. The mixture is gently heated and the dyestuff is salted out, filtered off and dried. It is after being dried and pulverized, in the shape of its sodium salt a dark powder which is soluble in water with a violet color and which is soluble in concentrated sulfuric acid with a greenish-blue color. By reduction with stannous chlorid and hydrochloric acid 1.8-aminonaphthol-3.6-disulfonic acid, 2.5-diamino-1.4-dimethylbenzene and 2.6-diamino-5-naphthol-7-sulfonic acid are obtained. The new dyestuff dyes cotton reddish-violet shades.

In the following table the shades of some of the new dyes are given:

| Dyestuff obtained from: | Dyes cotton: |
|---|---|
| 1) 1-8-aminonaphthol-3.6-disulfonic acid+cresidin+2.5-aminonaphthol-7-sulfonic acid | violet. |
| 2) 1.8-aminonaphthol-3.6-disulfonic acid+meta-toluidin+2.5-aminonaphthol-7-sulfonic acid | reddish-violet. |
| 3) 1.8-aminonaphthol-4.7-disulfonic acid+cresidin+2.5-aminonaphthol-7-sulfonic acid | violet-blue. |
| 4) 1.8-aminonaphthol-3.5-disulfonic acid+cresidin+2.5-aminonaphthol-7-sulfonic acid | reddish-blue. |
| 5) 1.8-aminonaphthol-4-sulfonic acid+cresidin+2.5-aminonaphthol-7-sulfonic acid | violet. |
| 6) 1.8-aminonaphthol-5-sulfonic acid+cresidin+2.5-aminonaphthol-7-sulfonic acid | bluish-violet. |

The above described process is carried out in an analogous manner on using other 1.8- aminonaphthol sulfonic acids, or other suitable amins e. g. alpha-naphthylamin etc. to produce the intermediate compounds capable of being diazotized.

Having now described our invention and in what manner the same is to be performed, what we claim as new and desire to secure by Letters Patent is:—

1. The herein-described new azo-dyestuffs obtainable by combining the diazocompounds of 1.8-aminonaphthol sulfonic acids with suitable amins, then diazotizing these intermediate compounds and combining the thus produced diazoazocompounds with 2-amino-5-naphthol-7-sulfonic acid, which dyestuffs are, after being dried and pulverized, in the shape of their alkaline salts, dark powders easily soluble in water; yielding upon reduction with stannous chlorid and hydrochloric acid 1.8-aminonaphthol sulfonic acid, a diamin and 2.6-diamino-5-naphthol-7-sulfonic acid, dyeing cotton from bluish-red to violet to blue shades, substantially as hereinbefore described.

2. The herein-described new azo-dyestuff, which can be obtained by combining the diazocompound of 1.8-aminonaphthol-3.6-disulfonic acid with para-xylidin, diazotizing the intermediate compound thus produced and combining the diazoazocompound with 2-amino-5-naphthol-7-sulfonic acid, which dyestuff is, after being dried and pulverized, in the shape of its sodium salt a dark powder soluble in water with a violet color and soluble in concentrated sulfuric acid with a greenish-blue color; yielding upon reduction with stannous chlorid and hydrochloric acid 1.8-aminonaphthol-3.6-disulfonic acid, 2.5-diamino-1.4-dimethylbenzene, and 2.6-diamino-5-naphthol-7-sulfonic acid; and dyeing cotton violet-red shades, substantially as hereinbefore described.

In testimony whereof we have hereunto set our hands in the presence of two subscribing witnesses.

OSCAR GÜNTHER. [L. S.]
LEOPOLD HESSE. [L. S.]

Witnesses:
OTTO KÖNIG,
WM. WASHINGTON BRUNSWICK.